United States Patent [19]

Morimoto et al.

[11] Patent Number: 4,838,641
[45] Date of Patent: Jun. 13, 1989

[54] OPTICAL FIBER CONNECTOR

[75] Inventors: Yoshitaka Morimoto; Hideya Tabe, both of Tokyo, Japan

[73] Assignee: NEC Corporation, Tokyo, Japan

[21] Appl. No.: 785,537

[22] Filed: Oct. 8, 1985

[30] Foreign Application Priority Data

Oct. 8, 1984 [JP] Japan .................. 59-210699

[51] Int. Cl.⁴ .............................................. G02B 6/38
[52] U.S. Cl. .................. 350/96.21; 350/96.20
[58] Field of Search ............... 350/96.20, 96.21, 96.22

[56] References Cited

U.S. PATENT DOCUMENTS

| | | | |
|---|---|---|---|
| 4,268,115 | 5/1981 | Slemon et al. | 350/96.20 |
| 4,339,171 | 7/1982 | Makuch et al. | 350/96.20 |
| 4,427,879 | 1/1984 | Becher et al. | 350/96.20 |
| 4,435,036 | 3/1984 | Sasakawa | 350/96.20 |
| 4,478,485 | 10/1984 | Khoe et al. | 350/96.20 |
| 4,478,487 | 10/1984 | Obeissart | 350/96.21 |
| 4,533,209 | 8/1985 | Segerson et al. | 350/96.20 |
| 4,611,887 | 9/1986 | Glover et al. | 350/96.21 |

Primary Examiner—William L. Sikes
Assistant Examiner—Robert E. Wise
Attorney, Agent, or Firm—Foley & Lardner, Schwartz, Jeffery, Schwaab, Mack, Blumenthal & Evans

[57] ABSTRACT

A two-piece optical fiber connector comprises an internal member and an external member. The internal member includes a block having a hole which receives the end of an optical fiber cord and cantilevers provided along the side walls of the block having internal and external projections when no force is applied. The external member includes an opening through which the optical fiber cord is inserted and an opening or recess which engages with the external projections of the cantilevers when the block of the internal member is fit into the external member axially and slidably. Once the internal member and external member are fitted, the internal projections on the cantilevers securely hold the optical fiber cord in place.

12 Claims, 2 Drawing Sheets

OPTICAL FIBER CONNECTOR

BACKGROUND OF THE INVENTION

The present invention relates to an optical fiber connector, and more particularly to an optical fiber connector of a simple form.

As the transmission loss of optical fibers is reduced greatly, optical transmission over longer distances is increasingly used in practice. In the long distance transmission of this type, coupling loss is a critical factor which imposes restriction in determination of the transmission distance. Optical fiber connectors using a large number of expensive and high precision components serve such a transmission. For the optical communication which transmits control signals, for instance, inside an automobile, aircraft and various other apparatus and machines, on the other side, optical connector of lower price and of simpler structure may be used as the transmission distance is not very long. However there have not been available in the market optical fiber connectors which are cheap in price and simple in manipulating attaching/detaching for the purpose of this sort.

SUMMARY OF THE INVENTION

An object of the present invention is to provide an optical fiber connector of a simple type which can be easily connected or disconnected.

Another object of this invention is to provide an optical fiber connector which can be connected with and disconnected from an optical fiber without disassembling component parts thereof.

The optical fiber connector according to this invention comprises an internal member including a block having a hole which receives a sheath portion at an end of an optical fiber cord as well as an optical fiber exposed from the sheath portion axially, and cantilevers provided on side walls of the block to extend along the side walls having respectively an internal projections as well as a projection protruding outward when no force is applied, and an external member having an opening through which the optical fiber cord is inserted and an opening or recess which engages with the projection on the cantilever of the internal member on the side wall thereof to be fit into the block of the internal member axially and slidably. The optical fiber connector of this invention is characterized in that as the internal member is being inserted, the projections of the cantilevers are pressed with the internal wall of the external member so that the cantilevers are deflected inward to reach a position to securely hold the optical fiber cord therebetween and that the external member is prevented from receding by the projections protruding from said openings or recesses.

The internal member receives an optical fiber and an optical element fixed on an end of the block through which the optical fiber is inserted. When engaged with the external member, the projections of the cantilevers formed on the side walls of the block of the internal member come to engage with the outside sheath of the optical fiber cord to secure it.

BRIEF DESCRIPTION OF THE DRAWINGS

The features and advantages of the invention will be more apparent from the detailed description hereinunder taken in conjunction with the accompanying drawings wherein.

DESCRIPTION OF THE PREFERRED EMBODIMENTS

Figure 1:
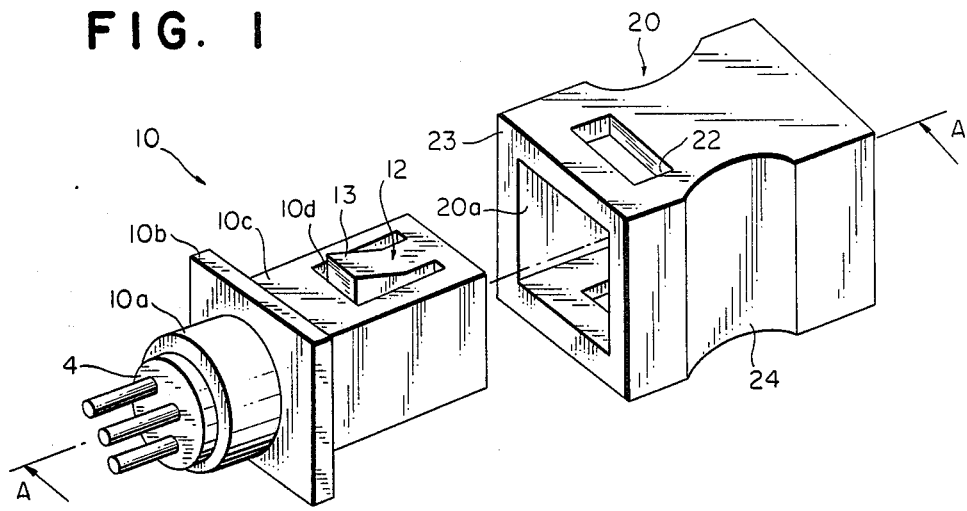
FIG. 1 is an exploded perspective view of the first embodiment of this invention.
Figure 2A:
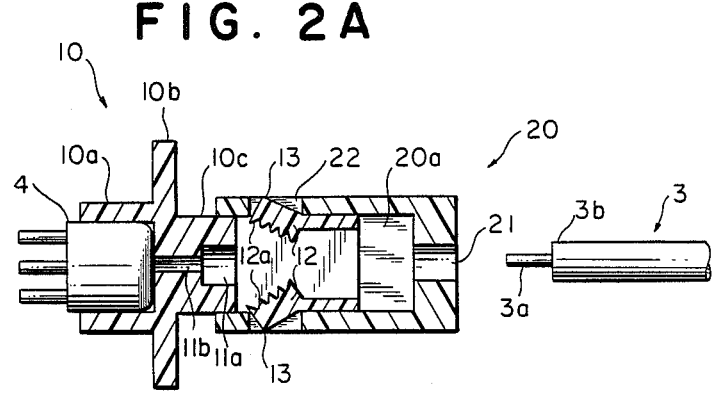
FIGS. 2A and 2B are cross sectional views of the optical fiber connector shown in FIG. 1 along the line A—A to show the states before and after attachment of an optical fiber cord respectively.
Figure 2B:
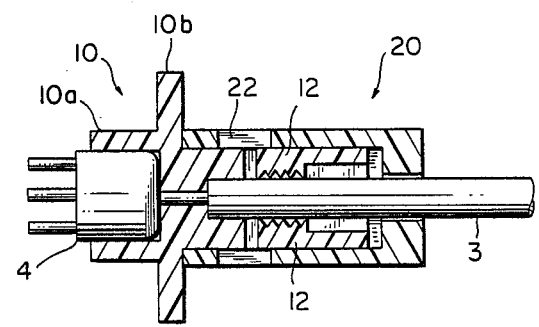

The first embodiment of this invention is described referring to FIGS. 1, 2A and 2B.

An optical fiber connector comprises a plastic internal member 10 and a plastic external member 20. Both internal and external members 10 and 20 are engaged coaxially in a manner to permit sliding.

The internal member 10 comprises a hollow cylindrical block 10a on one side of a flange 10b which houses an optical device 4 such as a light emitting diode or an avalanche photodiode, and a hollow block 10c on the other side of the flange 10b. Those components are integrally formed. The block 10c has a rectangular section in the direction perpendicular to the central axis A. Openings 10d are formed respectively on a pair of outer walls which are opposed to each other. Cantilevers 12 are formed in the openings to extend from the ends of the block toward the flange in the direction parallel to the axis A. On the ends of the cantilevers 12 are formed plural projections 12a internally. The portions from which the projections protrude are deviated from the axis A toward the outside when no force is applied by a predetermined angle so as to form projections 13. The flange 10b and block 10c are bored with holes 11a and 11b along the axis A respectively and the hole 11b extends to the hole 11a but has a smaller diameter. The hole 11a receives the sheath portion 3b on the tip end of the optical fiber cord while the hole 11b an optical fiber 3a which is exposed by a predetermined length from the sheath portion 3b. The optical fiber 3a is a plastic fiber comprising a core of polymethyl methacrylate and a cladding of fluorocarbon resin and the outer sheath 3b is made of black polyethylene.

The external member 20 has a hollow portion 20a of a rectangular cross section to receive the block 10c of the internal member 10 and is provided with an opening 21 (FIG. 2A) on the rear end thereof through which the sheath portion of the optical fiber cord is inserted. Openings 22 are bored on side walls to oppose the projections 13 of the block 10c when coupled with the internal member. Curved grips 24 are formed on the other pair of side walls. As shown in FIG. 2A, the openings 22 are dimensioned so as to have the projections 13 on the tip end of the cantilevers protrude when the block 10c is inserted into the external member 20 by a certain length. When the cantilevers 12 are made to advance without optical fibers 3 attached thereto, the projections 13 are pressed inward by the walls of the external member 20 in front of the openings 22. The openings 22 first pass over the cantilevers 12 as the external members 20 proceeds to ultimately receive the projections 13 therethrough as shown in FIG. 2A. This prevents the external member 20 from receding.

The optical fiber connector of this invention is kept in storage at the state shown in FIG. 2A with the internal member 10 and the external member 20 assembled until the time of use. If dismounted after a use, the optical fiber cord is kept in that state shown in FIG. 2A until the next use. As the external member 20 is prevented from receding with the projections 13 protruding through the openings 22 of the external member 20, there is no possibility of losing a component while the connector is kept in storage or after it is disassembled.

In attaching an optical fiber cord, an optical fiber cord 3 is inserted into the holes 11a and 11b through the opening 21 on the external member 20 of the optical fiber connector which is kept at the state shown in FIG. 2A. As the external member 20 is made to advance forward, the projection 13 on the cantilevers 12 are pressed inward with the sliding walls on the side rear of the openings 22 of the member 20 while the front edges abut on the flange 10b. As shown in FIG. 2B, the optical fiber cord 3 is fully coupled with other optical element 4 as the sheath of the cord 3 is secured with the projections 12a of the cantilevers 12. The external member 20 is held with the friction generated against the output periphery surfaces of the internal member 10 and the expansive force of the projections directed outward.

When the connector disconnects the coupling, the external member 20 is made to recede overcoming the friction against the member 10 to come to the state shown in FIG. 2A, and then the optical fiber cord 3 is pulled out.

Figure 3:
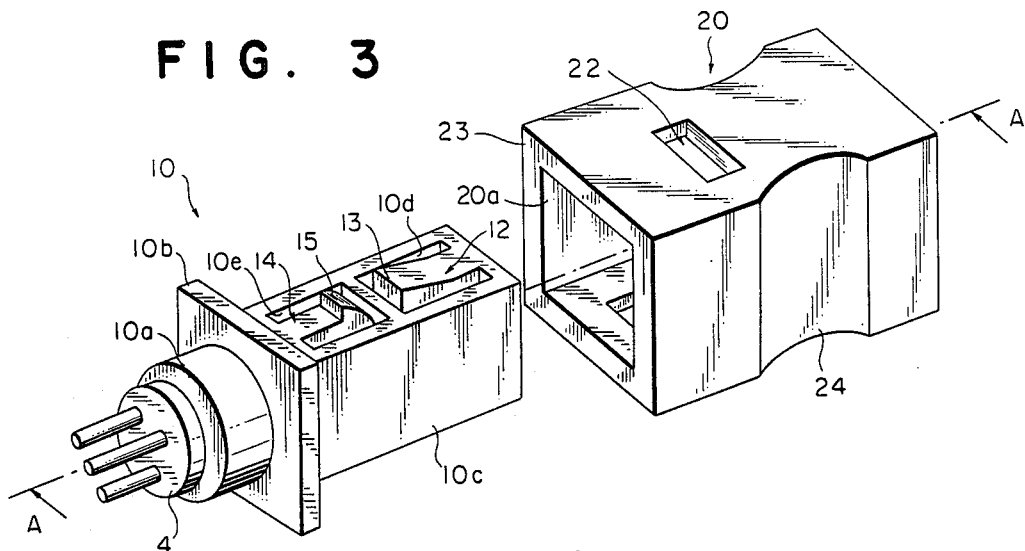
FIG. 3 is an exploded perspective view of the second embodiment of this invention.

FIG. 3 is a perspective view to show another embodiment of the optical fiber connector according to this invention. It shows the connector in the state before an optical fiber cord is inserted.

In FIG. 3 the same component elements are denoted with the same reference numerals as in FIG. 1. This embodiment differs from that shown in FIG. 1 in that the block 10c of the internal member 10 is formed with the cantilevers 14 and the openings 10e. The openings 10e are bored on the walls which are also bored with the openings 10d serially therewith. The cantilevers 14 extend from the walls of the openings 10e on the side of the flange 10b toward rear ends of the internal member 10 in parallel to the central axis A. The ends of the cantilevers 14 define claws 15 projecting outward from the direction of central axis A.

Figure 4A:
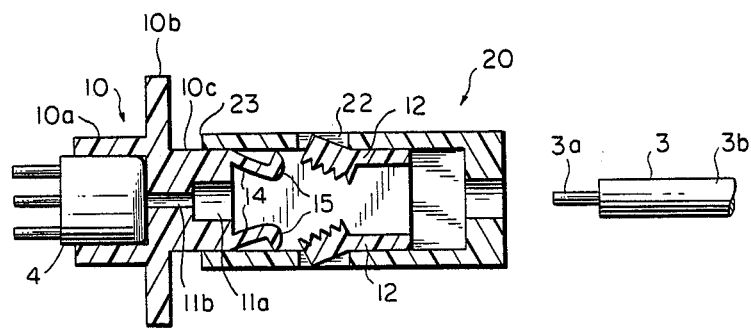
FIGS. 4A and 4B are cross sectional views of the optical fiber connector shown in FIG. 3 along the line A—A to show the states before and after attachment of an optical fiber cord respectively.
Figure 4B:
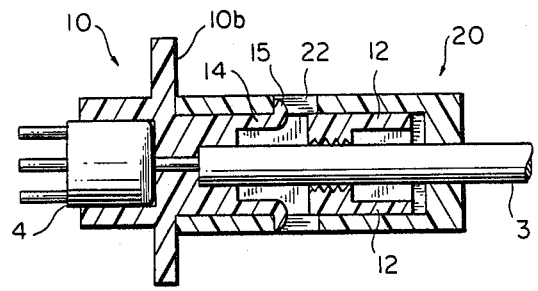

As shown in FIG. 4A, when the internal member 10 is being inserted into the external member 20 without attaching optical fiber cord 3 therewith, the claws 15 of the cantilevers 14 are pressed inward with the internal walls of the external member 20 in front of the openings 22 so as to allow the advance of the external member 20.

When an optical fiber cord 3 is about to be attached, and the external member 20 is further advanced from the state in FIG. 4A to the extent that the ends 23 come to abut on the flange 10b of the internal member 10, the claws 15 of the cantilevers 14 project from the openings 22 of the external member to engage the front edges of the openings 22 with the rear ends of the claws 15 respectively. This makes the external member 20 securely locked at the position without allowing the member 20 either to advance or recede therefrom. The connector is therefore kept in the coupled state and is fully prevented from being loosened.

If necessary, spring washers may be provided between the flange 10b of the internal member 10 and the front edges 23 to absorb dimensional errors caused in manufacturing.

For disconnecting the coupling of the connector, an external force transmission means having a narrow end such as a screwdriver is inserted into the openings 22 to press inward the claws 15 of the cantilevers 14 while the external member 20 is moved rearward. When the state becomes as shown in FIG. 4A, the optical fiber cord 3 is pulled out.

Figure 5:
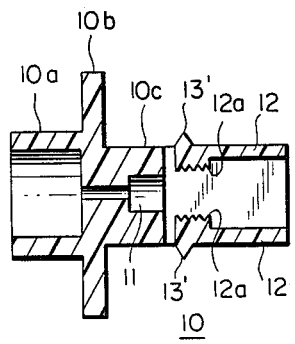
FIG. 5 is a cross sectional view of another embodiment of the internal member used in embodiments of this invention.

Although the structure having openings 22 on the external member 20 has been described for the above embodiments, recesses may be formed on the internal walls of the member 20 in place of the openings to engage with the projections 13 of the cantilevers 12. Projections 13' (FIG. 5) which protrude from the ends of the cantilevers respectively in the direction opposite to the axis A may be provided to replace the projections 13. The internal member when completely inserted in the external member, comes to securely grip the sheath portion of an optical fiber cord as the cantilevers 12 thereof are deflected inward.

In the above description, although the sections of the block 10c of the internal member 10 and of the external member 20 perpendicular to the central axis A are rectangular, they may be of an arbitrary shape such as a polygon, circle or oval so long as they are provided with cantilevers 12 to oppose each other.

An example where an optical fiber cord is coupled with a light emitting or light receiving element is described in the foregoing description. Optical fibers may be coupled by means of this invention connector by constructing the internal member 10 with the block 10c symmetrically on both right and left sides of the flange 10b.

As described in the foregoing statement, the optical fiber connector according to this invention has the structure of unrotatable type which allows an internal and an external member to engage with each other in a slidable manner. Unlike the conventional connectors of a rotatable type, it does not require rotation of coupling nuts every time the members are assembled or disassembled, thereby greatly simplifying the operation of attaching/detaching.

As the internal member of the present invention connector is provided with cantilevers having projections which project outward from the interfaces with an external member so that when the internal member is being inserted into the external member, the projections project through openings or recesses of the external member when they come to the position, the external member is secured at the position and is not permitted to recede therefrom. Therefore, optical fibers may be attached to the connector without the need of disassembling the internal member from the external member. As the two members may be kept assembled even after optical fibers are detached from the connector, there is no possibility to lose one of the components.

What is claimed is:

1. An optical fiber connector comprising:
    (a) an internal member having at least one operating for receiving a sheathed optical fiber,
    (b) cantilevers formed on said internal member, said cantilevers having outwardly protruding projections protruding outward from said internal member and inwardly protruding projections protruding into an internal portion of said internal member for engagement with the sheathed optical fiber; and (c) an external member having a first opening for receiving said internal member and having a second operating for receiving at least the optical fiber, said external member further having recesses formed on a portion thereof for engaging the projections protruding outward from said cantilevers, said portion comprising a rigid non-cantilevered part of a wall of said external member; and said external member slidable over said outwardly protruding projections without relative rotation of said internal and external members and said outwardly protruding projections slidable along said rigid, non-cantilevered part of said wall for biasing said cantilevers inwardly against the rigid non-cantilevered part of said wall thereby forcing said inwardly protruding projections into engagement with said sheathed optical fiber.

2. The optical fiber connector as claimed in claim 1 wherein said internal member includes a block having cantilevers provided on the side walls thereof, said cantilevers of said block having projections protruding outward from said block when no force is applied thereon and said cantilevers of said block having a portion thereof extending into said recess when said inwardly protruding projections engage said sheathed optical fiber.

3. The optical fiber connector as claimed in claim 1 wherein said recesses are openings.

4. The optical fiber connector as claimed in claim 1 further including:
a flange integrally formed on said internal member; and
an optical device housed in said flange.

5. The optical fiber connector a claimed in claim 1 further including at least one other cantilever having an outwardly protruding projection extending into said recess when said inwardly protruding projections are in engagement with said sheathed optical fiber.

6. An optical fiber connector comprising:
(a) a first member having
 (1) a housing having a predetermined cross-sectional configuration at an end portion thereof, and a first and second rigid, non-cantilevered wall, each wall having a recess therein, and
 (2) a central bore-section extending completely therethrough and having a diameter such as to receive a sheathed optical fiber,
(b) a second member having
 (1) a housing having an end portion thereof with a cross-sectional configuration slidably matingly engaging said end portion of said first member and
 (2) a bore extending through a central region thereof and having a diameter at least as large as an unsheathed optical fiber cord,
 (3) first and second cantilevers each having an inward-protruding projection and an outward-protruding projection, and
(c) said first and second members including coupling means including said first and second cantilevers and said recesses, and operative without relative rotation of said first and second members for slidably securing said first and second members together and for simultaneously securing said optical fiber to said connector.

7. An optical fiber connector as claimed in claim 6, wherein said coupling means comprises a cantilever connected to at least one of said first and second members and a recess or opening in the other of said first and second members.

8. An optical fiber connector as claimed in claim 7, wherein said cantilever has a first projection extending within said recess or opening when said first and second members are in said first position.

9. An optical fiber connector as claimed in claim 8, wherein said cantilever includes a second projection engaging said sheath of said optical fiber when said first and second members are in said second position.

10. An optical fiber connector as claimed in claim 7, wherein said cantilever includes a second projection engaging said sheath of said optical fiber when said first and second members are in said second position.

11. An optical fiber connector assembly comprising:
an optical fiber cord including an optical fiber for guiding light and a sheath member covering said optical fiber;
an internal housing member having a hole therethrough, and first and second resilient cantilevers located in opposing side walls thereof, each of said first and second cantilevers having an inward-protruding projection and an outward-protruding projection;
an external housing member having a passageway including first and second rigid, non-cantilevered walls for snugly mating with said internal housing members, and an opening communicating with said passageway and formed in a longitudinal direction; and
wherein said sheath member of a front end of said optical fiber cord inserted into said hole of said internal housing member through said opening of said external housing member is securely fastened with said inward-protruding projections of said internal housing member, said inward-protruding projection urged inwardly by a force exerted on said outward-protruding projections by sliding said external housing member in said longitudinal direction of said internal housing member without relative rotation therebetween so that said passageway of said external member accommodates said internal housing member in such a manner that said first and second rigid, non-cantilevered walls of the external housing member contacts said outward-protruding projections of said first and second cantilevers respectively.

12. An optical fiber connector assembly comprising:
an optical fiber cord including an optical fiber for guiding light and a sheath member covering said optical fiber;
an internal housing member having a hole therethrough, and first and second resilient cantilevers located in opposing side walls thereof, each of said first and second cantilevers having an inward-protruding projection and an outward-protruding projection;
an external housing member having a passageway for snugly mating with said internal housing member, an opening communicating with said passageway and formed in a longitudinal direction, and a pair of openings formed in opposing side walls of said external housing member, said pair of openings being capable of latchably engaging with said outward-protruding projections in the assembling process of said internal housing members, and said external housing members; and wherein said sheath member of a front end of said optical fiber cord inserted into said hole of said internal housing member through said opening of said external housing member is securely fastened with said inward-protruding projections of said internal housing member, said inward-protruding projections urged inwardly by a force exerted on said outward-protruding projections by slicing said external housing member in said longitudinal direction of said internal housing member without relative rotation therebetween so that said passageway of said external member accommodates said internal housing member and such that said opposing side walls of the external housing member prevent expansion of said inward-protruding projections because said opposing side walls bias said outward-protruding projections inwardly, said opposing side walls being rigid and having no cantilevers formed in contact areas with said outward-protruding projections.

* * * * *